(12) United States Patent
Barthel et al.

(10) Patent No.: US 7,944,818 B2
(45) Date of Patent: May 17, 2011

(54) HIGH-AVAILABILITY COMMUNICATION SYSTEM

(75) Inventors: Herbert Barthel, Herzogenaurach (DE); Reiner Griessbaum, Rülzheim (DE); Enrico Ramm, Chemnitz (DE); Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 151 days.

(21) Appl. No.: 12/231,662

(22) Filed: Sep. 4, 2008

(65) Prior Publication Data
US 2009/0059947 A1   Mar. 5, 2009

(30) Foreign Application Priority Data
Sep. 5, 2007  (EP) .................................. 07017367

(51) Int. Cl.
*H04L 12/28* (2006.01)
(52) U.S. Cl. ........................................ 370/228; 370/437

(58) Field of Classification Search ................... None
See application file for complete search history.

(56) References Cited

U.S. PATENT DOCUMENTS

| | | | |
|---|---|---|---|
| 2002/0118668 A1* | 8/2002 | Sawey et al. .................. | 370/350 |
| 2003/0081589 A1* | 5/2003 | Marian et al. ................. | 370/351 |
| 2004/0076148 A1* | 4/2004 | Ferry et al. .................... | 370/389 |

\* cited by examiner

*Primary Examiner* — Jianye Wu

(57) ABSTRACT

There is described a communication system for reliable communication between communication stations, wherein there is at least one communication connection between the communication stations, wherein the communication connection features at least two channels for transmitting payload data telegrams, wherein only one channel acts as primary channel for the communication at any time, and wherein the other channels are provided as backup channels. A status indicator in the payload data telegram is provided for the indication of information concerning which channel is primary channel or backup channel at a given time point, wherein the communication stations adopt as primary channel that channel for which, during receipt of the payload data telegrams, the most recent status change from backup channel to primary channel was detected by the communication stations.

20 Claims, 8 Drawing Sheets

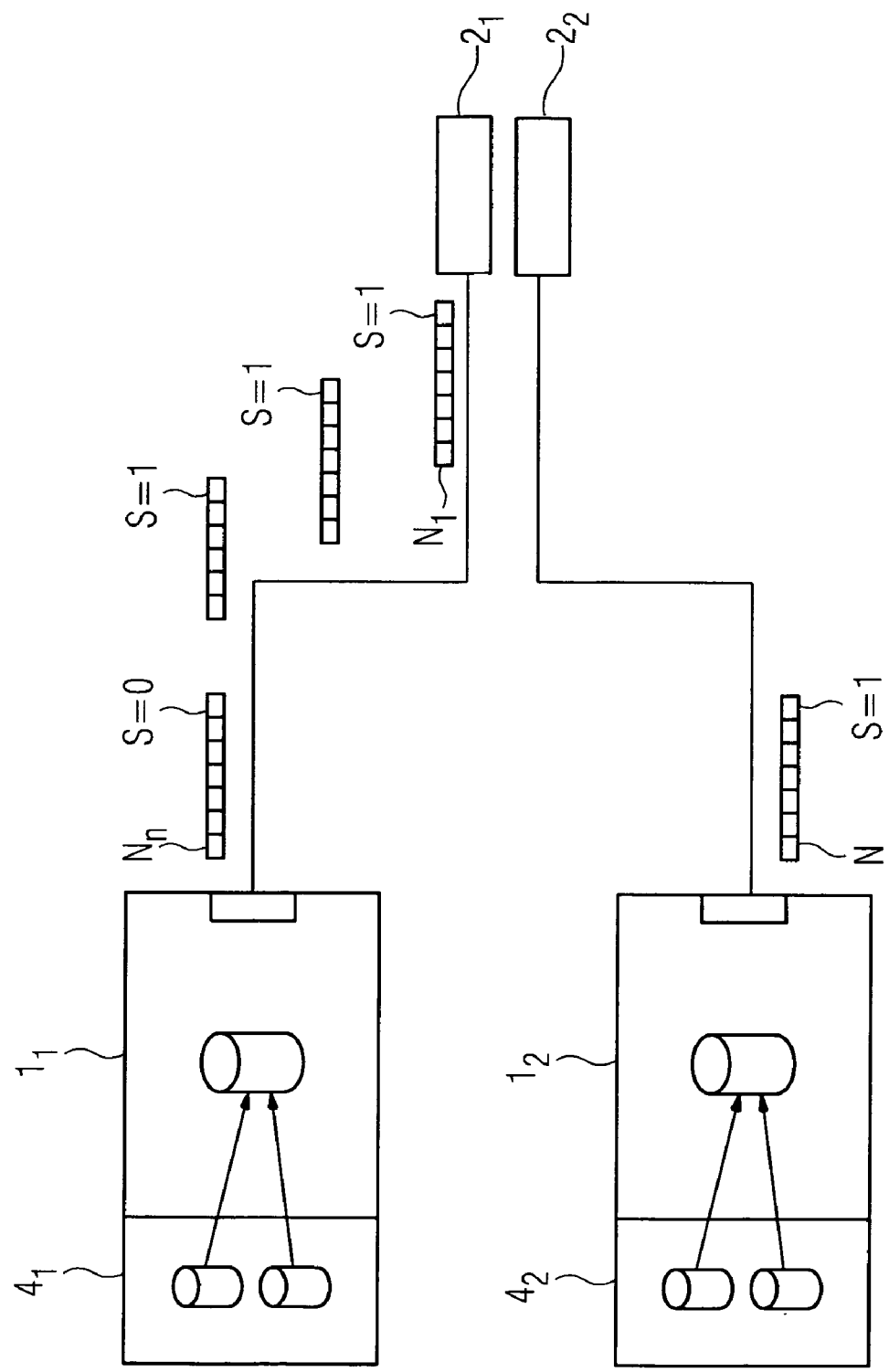

HIGH-AVAILABILITY COMMUNICATION SYSTEM

CROSS REFERENCE TO RELATED APPLICATIONS

This application claims priority of European Patent Office application No. 07017367.9 EP filed Sep. 5, 2007, which is incorporated by reference herein in its entirety.

FIELD OF INVENTION

The invention relates to a communication system for reliable communication between communication stations and to a method for reliable communication between communication stations.

BACKGROUND OF INVENTION

In systems in which the individual communication stations perform important functions and in which the communication taking place between the communication stations must be carried out in an uninterrupted manner, use is normally made of redundantly arranged communication channels such that even if one channel fails a data transmission can take place on the corresponding other channel between communication stations. The communication stations themselves can be e.g. field devices or control units in an automation system. In this context, the communication connection between the central control unit and the field devices is normally referred to as a field bus. Field bus components, i.e. the communication stations, are e.g. field bus controllers, field bus devices, switches, routers, cables and WLAN sections in this case. Apart from an automation system, e.g. in the context of a monitoring system, e.g. a building monitoring system or a flight traffic monitoring system, other components are also conceivable as communication stations instead of the control unit and the field devices. For example, security-oriented cameras can likewise transfer their data via secure communication channels as communication stations for the monitoring of public spaces.

In such an automation system or monitoring system, the reliability-relevant components or the communication stations are usually arranged in a redundant manner, i.e. at least duplicated, such that if a corresponding component or communication station fails, the redundant partner can intervene on behalf of the failed communication station. By virtue of the redundant arrangement of the reliability-relevant components and by virtue of the two-channel arrangement of the communication connection, it is always possible to provide a reserve communication path via which the relevant security-oriented components can reliably communicate. This means that the communication can continue without interruption via a reserve path in the event of any faults that may occur in the context of the automation system or monitoring system.

Existing solutions offer a plurality of possibilities for maintaining communication in the event of a fault. In a system such as Profibus DP, for example, system redundancy can be realized in such a way that there are two physical connections between the relevant components. As long as both communication channels are intact in this context, one of the two connections is the preferred channel or primary channel, and the other connection functions as a reserve channel or backup channel. Data is transferred between the communication stations via both data channels in this type of arrangement, but only the data of the preferred channel is valid for analysis by the components that are attached. However, data telegrams are also carried on the reserve channel in order to test the connection continuously. If a field bus controller detects a communication fault in the preferred channel to a field bus device in the system, for example, the field bus controller sends a special switchover telegram on the reserve connection, which switchover telegram tells the field bus device to switch over to the corresponding reserve channel and hence to utilize this as the preferred channel subsequently. However, it is disadvantageous in this context that the switchover telegrams which are transferred when the fault is detected are transmitted asynchronously relative to the cyclical payload data, and additional measures are therefore required, e.g. the introduction of a wait time or a delay time, in order to prevent a so-called switchover impact. In this context, a switchover impact is understood to signify that, as a result of the switchover, data from an application cycle prior to the most recently received application cycle is accepted by the data recipient. Although such an erroneous receipt would be recognized as an error, a security response would nonetheless be initiated if a security protocol were concurrently in use, e.g. disconnection of the equipment, which should be prevented by a so-called smooth switchover. In particular, such a solution is not suitable for redundant connections having significantly differing propagation times, where the redundantly arranged components are widely dispersed in the framework of the network topology or are situated at different locations of the network such that the data telegrams require significantly differing propagation times in order to be sent from a corresponding sender to the redundant components, since the switchover telegram possibly reaches the redundant partners at a time which differs significantly between the redundant partners. A corresponding delay time must therefore be introduced in order to ensure a correct switchover between the preferred channel and the reserve channel.

In the case of a further system, the Profibus DP with Flying Redundancy, there can be one or two physical connections for communication. The field bus can be supported by one or two field bus controllers in this type of arrangement. The field bus devices can have one or two interfaces to the field bus. However, it is a fundamental property that there is logically only one field bus, irrespective of how many cables are used to carry the communication. In principle, all components are connected together. As described above, there is also a preferred channel and a reserve channel here, with the same principles except that said channels share a logical field bus. In the case of Flying Redundancy, the field bus station addresses are automatically exchanged at the field bus device in the case of each switchover. In this context, the preferred channel is always a connection between a field bus controller and a fixed address at the field bus device, irrespective of which of the two interfaces currently has the address. The reserve channel exists between the field bus controller and a field bus interface having the address of the preferred channel, which address is increased by a fixed offset. In this type of arrangement, the disadvantage is again that switchover telegrams are required for switching over between the preferred channel and the reserve channel, wherein said switchover telegrams are transmitted asynchronously relative to the cyclical payload data.

When using Ethernet, there are likewise two physical connections and communication takes place via both of these. All telegrams are numbered in this context. The telegrams having the most recent number are accepted. This method has the disadvantage of being very costly and requires a close coupling between the two redundantly arranged recipients since the telegram numbers must be compared continuously in order to decide which is the most recent data telegram and hence which data telegram is to be used. Such an architecture or this method can only be used if the corresponding communication stations, e.g. the field bus controllers, are very close to each other (<1 m) and have a dedicated communication connection. However, such a method is unsuitable e.g. in the case of systems which are widely distributed in physical terms, where the redundant components, e.g. the control units in an automation system, are widely separated and therefore the distance between the redundant field bus controllers can be greater than 1000 m. Moreover, in such a case the field bus controllers would not be able to feature a dedicated individual communication connection via which the number comparison can take place.

SUMMARY OF INVENTION

The present invention addresses e.g. the problem of specifying a communication system and a corresponding method wherein, in a communication system which is arranged to comprise multiple channels, a smooth switchover is possible between the primary channel and one or more backup channels.

The problem is solved by a communication system for reliable communication between communication stations, comprising at least one communication connection between the communication stations, wherein the communication connection features at least two channels for transmitting payload data telegrams, wherein only one channel acts as primary channel for the communication at any time, and wherein the other channels are provided as backup channels, and comprising a status indicator in the payload data telegram for the indication of information concerning which channel is primary channel or backup channel at a given time point, wherein the communication stations adopt as primary channel that channel for which, during receipt of the payload data telegrams, the most recent status change from backup channel to primary channel was detected by the communication stations.

The problem is furthermore solved by a method for reliable communication between communication stations, in which payload data telegrams are transmitted between the communication stations via at least two channels, wherein only one channel acts as primary channel for the communication at any time and wherein the other channels are used as backup channels and, and in which the information concerning which channel is primary channel or backup channel at a given time point is indicated by means of a status indicator in the payload data telegram, wherein the communication stations adopt as primary channel that channel for which, during receipt of the payload data telegrams, the most recent status change from backup channel to primary channel was detected by the communication stations.

In one aspect the invention is for example based on the insight that in a communication system which is configured to have multiple channels, and in which it must be unambiguously clear at all times which of e.g. four communication channels is the primary channel and which are reserve or backup channels, the switchover between the channels must be as economical as possible and always take place smoothly. In this context, smoothly is understood to signify that the data from the most recent application cycle is also received as such at all times via the corresponding channel by a communication station or a component within the framework of the communication system, and that e.g. previous data is not transferred to and analyzed by the device or component. In particular, the present invention might utilize the possibility of informing the subscribing components in the communication system, in a simple manner, which of those channels via which they send and receive is to be used as primary or as backup channel. For this, the status of the channel is simply indicated in the context of the payload data that is transmitted in any case in the form of telegrams. The status information is simply appended to the payload data telegram which is sent e.g. from a field bus controller to a corresponding field device or field bus device. The status in the payload data telegram is then switched. This status change when transferring the payload data telegram is utilized by the system in order to allow the relevant data to be selected in a simple manner. The communication stations or recipients only need to "listen in" for the status change. When analyzing the payload data telegram, the corresponding field device can therefore determine immediately whether the data telegram was sent via the primary or the backup channel.

An additional transfer of switchover telegrams or a comparison of the corresponding numbers, which were appended to the telegrams in the prior art in order to signal the currency of the data telegram, becomes unnecessary in the case of the approach proposed in the context of the invention. The payload data telegrams can therefore be simply analyzed and the status information can be transferred e.g. via any number of redundant channels.

In the context of the present invention, in order to ensure that e.g. a plurality of channels are not recognized as primary channels by virtue of their transferring telegrams indicating the status of a primary channel, it is proposed that the recipients or the communication stations adopt as primary channel specifically that channel via which the most recent payload data telegram was received that had a status change signaling that it was a primary channel. The decision concerning which channel should actually be adopted as primary channel is therefore based on the method of "the last one wins". In other words, the channel having the most recent flank change from backup to primary in the status indicator is also considered to be the primary channel. As a result of this, clarity is ensured in the context of any number of channels, wherein it is presupposed that a specified time must elapse between switching over and switching back. It is thus ensured that a channel which has just become backup—due to an error on this channel—cannot immediately become primary again. In the case of a 4-channel connection, it is always possible quickly to switch to another intact channel, for example.

A further advantageous development of the invention is characterized in that one bit is provided as a status indicator in the payload data telegram. The payload data telegram is not significantly enlarged thereby. Simply appending one bit is sufficient for the participating communication stations to determine the status of the corresponding channel via which the payload data telegram was transferred. The information concerning whether it is a primary or a backup channel can only have two states in any case, and these can be communicated unambiguously to the communication stations by means of one bit. The status of the primary channel is advantageously indicated by means of a 1 and the status of the backup channel by means of a 0, for example.

A further advantageous development of the invention is characterized in that all communication stations are equipped for sending and receiving payload data telegrams. As a result of this, faults that are detected can be notified within the framework of the network by all communication stations and e.g. a switchover of the communication channels using the described method can be done by all communication stations. This has the advantage that, irrespective of where the fault occurs, it can be detected immediately and the switchover to the redundant communication channel can be initiated.

A further advantageous development of the invention is characterized in that in the case of a sender of a payload data telegram, the change of the status from the primary channel to the backup channel takes place without a delay. This is advantageous because a fault which is detected in the sender (e.g. this channel is disrupted on the recipient side) immediately results in a switchover of the channel, such that the data recipients, as soon as they receive the corresponding payload data telegram with the changed status information, immediately know that the corresponding channel is now merely a backup channel and that the data which is transferred via this channel must not be analyzed or used subsequently. The switchover information is therefore communicated to all participating data recipients immediately and without further delay.

If only the field bus controllers or the redundant CPUs specify which of the channels is to be primary channel, a further advantageous development of the invention is characterized in that the recipient (a field bus device here) of a payload data telegram is configured in such a way that it detects the failure of a primary channel (which the sender—a field bus controller here—did not detect previously because it is a failure which only relates to one communication direction) and, when it sends back data telegrams, immediately switches the status of its primary channel over to backup channel. This ensures that the sender, on the basis of the primary to backup switchover, quickly registers the channel failure and initiates a channel switchover.

A further advantageous development of the invention is characterized in that in the case of a sender of cyclical payload data telegrams, the change of the status from the backup channel to the primary channel does not take place until the sender has completely updated its payload data. This development of the invention is particularly advantageous if e.g. in the context of cyclical communication a field bus controller must initially collect the data from an attached host, e.g. a stored programmable control, in a full cycle before it can compose its corresponding payload data telegram and then transfer this via the communication system to the recipients, e.g. the field devices. If the sender were to switch over immediately from backup to primary channel in such a case, the data of a cycle might be inconsistent in the field bus controller under certain circumstances. In order to avoid this, the field bus controller waits until the complete payload data telegram has been composed and only then does the field bus controller as data sender switch over from backup channel to primary channel. A complete payload data telegram is therefore first composed, then assigned the corresponding status primary channel in the status bit, and then this payload data telegram is transferred with the primary channel information.

An alternative development of the invention is characterized in that the sender of payload data does not collect this over a complete cycle in order then to send it to the recipients, but instead the payload data is sent as soon as it arises and the recipient only switches the channel over when all data has arrived and the most recent payload data telegram has the status primary.

A further advantageous development of the invention is characterized in that the communication stations are equipped for storing the most recent payload data telegram that was received via a primary channel, if all channels have the status backup channel. A predefined time is provided for the storage of the payload data telegrams, and a predefined response of the communication stations is provided after expiry of said time. In particular, this embodiment has the advantage that in a case, in the case, that all channels of the communication system indicate backup status, the most current payload data telegrams that were sent to the communication stations via the most recent primary channel are frozen. A retention time can be defined during which the communication stations or the components store the data. If the components receive payload data telegrams again during this retention time, indicating a channel as primary channel, the system can then continue to run, otherwise e.g. a predefined response is initiated after a time has expired, e.g. all data is set to zero and the corresponding activities of the components are terminated or the equipment assumes an emergency stop status.

A further advantageous development of the system is characterized in that the communication stations are redundantly arranged such that they are at least duplicated. In order to ensure optimal functionality of the high-availability system, it is advantageous if all participating components are redundant, i.e. if in each case a redundant device can take over the corresponding function if its partner fails.

A further advantageous development of the invention is characterized in that a redundantly configured sender of a payload data telegram is configured in such a way that it detects the failure of its redundant communication station and switches the status of its channel to primary channel. This ensures that not only does an active switchover between the channels become possible in the context of a complete functioning system, but also that in the context of a complete failure, e.g. of a field bus controller, this failure can be detected immediately by its partner and the partner can then switch its communication channel to primary status accordingly.

A further advantageous development of the invention is characterized in that the communication stations are components of a security-oriented system, in particular an automation system or a monitoring system. The high availability of all components and the security of the corresponding data transmission are especially necessary in a security-oriented environment in particular. It must be ensured at all times that the participating components in the system receive the correct data and work with the correct data. This applies both in the field of automation and in the field of security-oriented monitoring systems.

In particular, the present invention has the advantages that such a communication system or method can be used for any number of reciprocally redundant channels, since the coordination effort only increases linearly with the number of redundant channels. As no unnecessary wait times are required for the purpose of avoiding a switchover impact, short switchover times are possible between the communication channels. The proposed solution allows a smooth switchover even in the case of widely differing payload data propagation times or telegram propagation times of the reciprocally redundant channels, because each station can detect at any time which is the relevant primary channel for the most recently received telegram.

As a result of the different switchover from primary to backup or backup to primary of the participating senders, an application is also feasible for cyclical communication such as Realtime Ethernet. By virtue of it being ensured that, in the case of a sender which is to switch over from backup to primary, the internal data for the payload data telegram is first composed in a cycle before the channel is switched over from backup to primary, it is ensured that the entirety of the payload data is sent.

By virtue of the simple implementation for indicating the status of the channel by means of one bit, a resource-saving possibility is proposed for ensuring the reliable and high-availability communication in the redundant system. A bit is simply appended to the telegram in the sender, said bit being then analyzed as a flank by the recipient. This simplicity is particularly important since it must also be possible to realize the system in non-redundant devices which communicate with redundant devices in a high-availability manner (using multiple channels). A non-redundant device therefore nevertheless recognizes via which channel it is to receive, i.e. recover its most recent payload data, or via which channel it is to transfer the current payload data.

In contrast with the prior art, in which the most current telegrams are marked by means of numbers and a corresponding comparison of the numbers must take place, it is not necessary to manage a telegram number overflow in the context of the present invention. Using the present system, moreover, it is not only possible to manage faults and failures of the communications link itself, but also to manage the failure of the communication interface e.g. of a field bus controller.

Furthermore, the solution can be implemented in any communication layer. It is particularly advantageous in this context that it can also be implemented in the highest communication layer: the redundant host, e.g. the stored programmable control, can assume responsibility for the coordination (primary channel—backup channel) of the reciprocally redundant channels. No additional communication connection between the redundant field bus controllers is required. Using the present invention, therefore, all communication faults can be managed smoothly.

The solution is additionally independent of the telegram propagation time, which can differ widely between the redundant channels, e.g. in the case of diverse connections between the communication stations.

For the purpose of implementing the solution, use is made of the fact that in terms of availability it is sufficient for one channel to be declared as primary channel and for the other channel or channels to work as backup. In this context, it is never necessary in practice to switch rapidly back and forth between the channels, since a defective field bus component remains defective until it is repaired. Therefore no switching back to this channel takes place during this time. The typical repair time is approximately four hours in this type of arrangement. Components which only function sporadically are generally not suitable for high-availability equipment, and therefore rapid switching back and forth is not necessary here either. The present solution also has the advantage that non-cyclical services such as a peripheral alarm or a non-cyclical payload data telegram are assigned a specific transport path, this being the primary channel in each case.

BRIEF DESCRIPTION OF THE DRAWINGS

The invention is described and explained in greater detail below with reference to the figures, in which:

FIG. 8 shows a schematic illustration of the delay in the switchover from backup to primary channel in the case of a recipient.

DETAILED DESCRIPTION OF INVENTION

Figure 1:
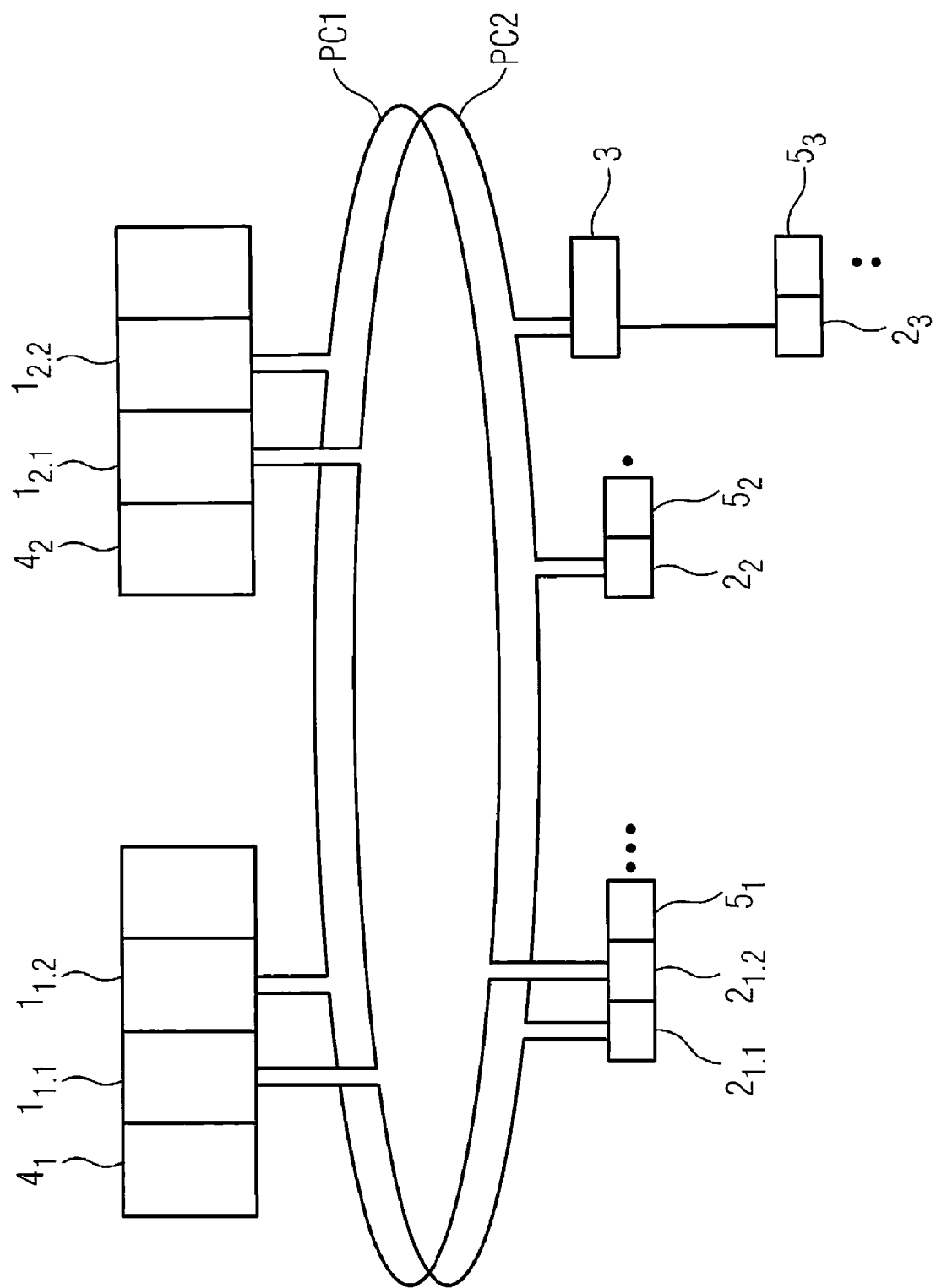
FIG. 1 shows a schematic structure of a communication system having a ring architecture.

The network architecture of a redundant system, in particular in the field of automation, is illustrated by way of example in FIG. 1. In the system, the communication stations 1,2 are connected together via redundantly arranged communication connections PC1, PC2. The communication connections are configured in the form of a ring here. The communication stations 1,2 can be e.g. senders such as field bus controllers 1, which in each case transmit the data of a so-called host, e.g. a CPU 4, via the communication system to data recipients, e.g. interface modules 2, which in turn are connected to field devices 5. In this context, the individual senders and recipients can be arranged redundantly or singly in each case. So-called switches 3 for a desired distribution of the data that is sent via the communication system can also be present within the framework of the architecture.

Figure 2:
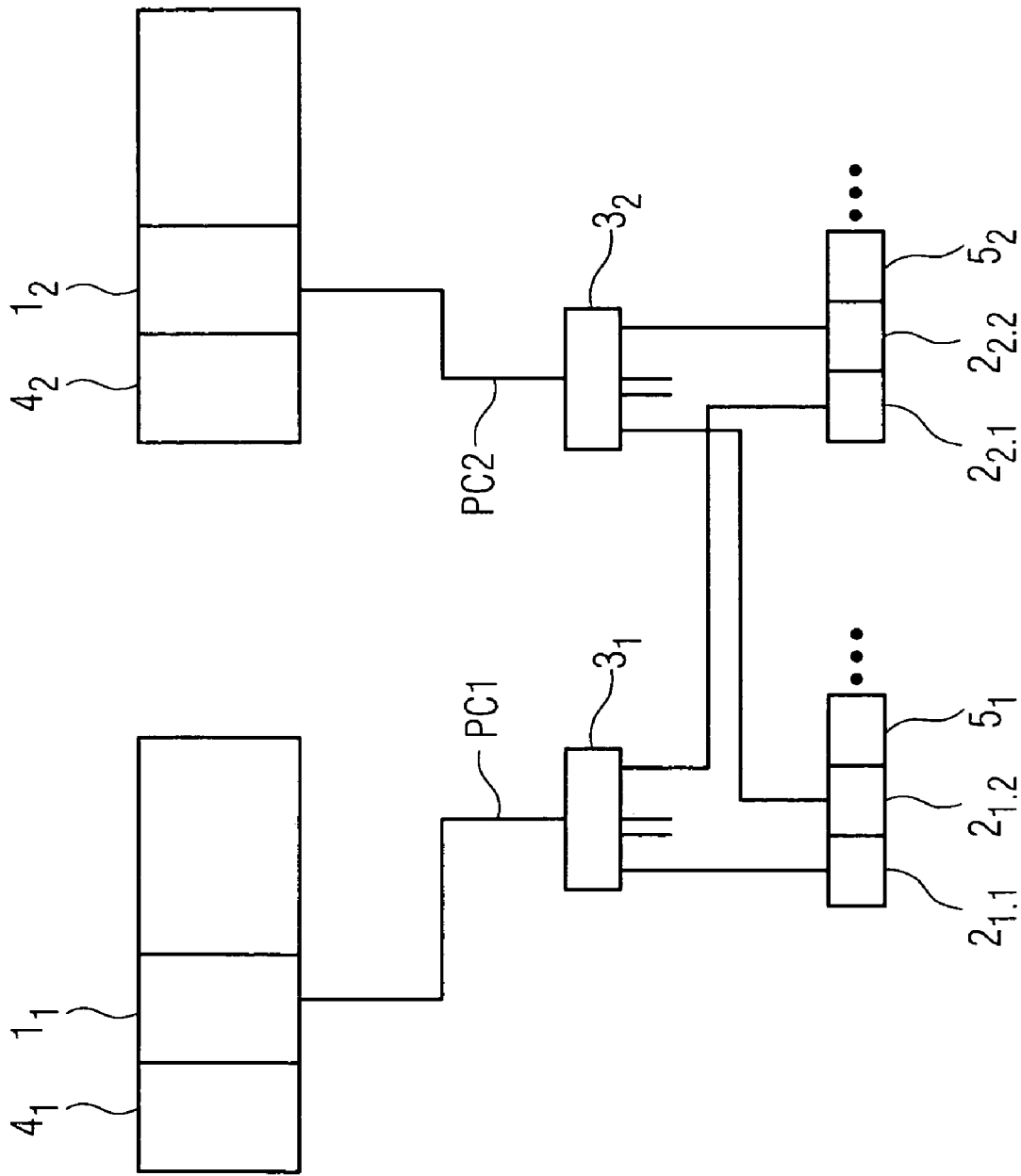
FIG. 2 shows a schematic structure of a communication system have a star architecture.

FIG. 2 shows a further possible architecture of a corresponding communication system with communication stations 1,2. The communication connections PC 1, PC 2 are configured in the form of a star in this context. Shown here are e.g. the senders of data telegrams such as the so-called field bus controller 1, which in each case input the data from a CPU 4 into the communication system. The senders 1 are connected via switches 3 to the recipients, e.g. interface modules 2. The interface modules 2 supply the field devices 5 with data from the communication system. The interface modules 2 themselves can also receive data from the field devices 5 and send this onward via the communication system to the control units or CPU 4 via the field bus controllers 1.

Figure 3:
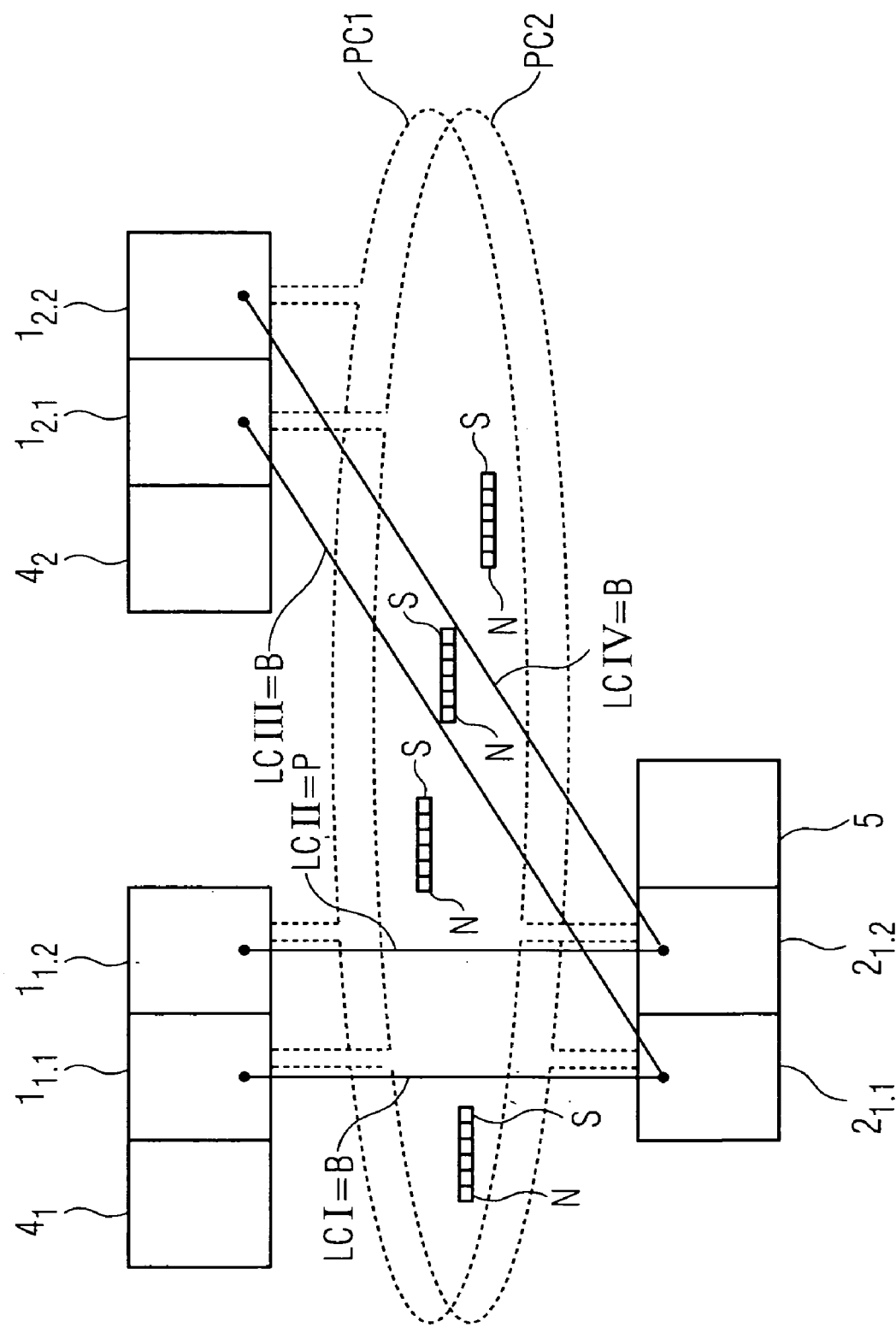
FIG. 3 shows the logic which is used as a basis for the communication of the communication stations.

FIG. 3 shows the logic which is used as a basis for the communication of the communication stations 1,2. In the exemplary embodiment shown here, the architecture as illustrated in FIG. 1 is assumed. In this context, the senders $1_{1.1}$, $1_{1.2}, 1_{2.1}$ and $1_{2.2}$ are connected to the recipients $2_{1.1}, 2_{1.2}$ via logical communication channels LC I, LC II, LC III, LC IV which are arranged redundantly. Of the redundant communication channels in the communication system, the channel LC II is identified as primary channel P and the channels LC I, LC III and LC IV are identified as backup channels B.

For the purpose of communication, payload data telegrams N are sent via the channels from the senders, e.g. the field bus controllers 1, to the recipients 2. In addition to the actual payload data, the payload data telegrams N feature a status indicator S, by means of which the participating communication stations 1,2 are informed which channel is primary channel P and which channel is backup channel B. The status information S can be appended to the payload data telegram in a simple manner and read out by the participating communication stations.

Because the assignment of a channel as primary channel or backup channel for a recipient takes place exclusively via the status bit of the relevant payload data telegram for the recipient, it is possible that the primary channel lies on a different logical communication path for each recipient or each device. All logical communication channels can be primary or backup channel for different recipients or devices. In the exemplary embodiment that is illustrated, the channel LC II is used as primary channel P for the data transmission, while the channels LC I, LC III and LC IV function as backup channels B for the data transmission. In this case also, the status of the relevant channel is notified to the communication stations 1,2 by means of a payload data telegram N, wherein the payload data telegram N features a status indicator S.

The communication system which is basically represented in the FIGS. 1, 2 and 3 functions according to the same principle irrespective of the architecture of its communication connections PC 1, PC 2. The channel that is to function as primary channel P for the data transmission is defined by the participating communication stations themselves as primary channel P by means of equipping a payload data telegram, which is transferred by a communication station 1,2, with the corresponding status information S. In this context, the status information S is simply appended to the payload data telegram N. The status information S can be one bit, for example. If the bit is set to 1, the corresponding payload data telegram N signals that this channel is to be used by the recipient 2 of the payload data telegram N as primary channel for the communication, and that this data is therefore the currently valid data for subsequent use, e.g. at the host 4 or at the field devices 5. The primary channel can therefore be different for each communication station. Likewise, such a payload data telegram N with the status information S indicating that the channel is to be used as primary channel P also notifies the recipients of the payload data telegrams that they are to transfer their current payload data via this channel.

Payload data telegrams N can be sent concurrently via the backup channel B for test purposes, however these then have a different status S in the context of the communication system according to the invention, specifically indicating that they function as backup channel B and that the data which is correspondingly received and sent via this channel does not have the same currency as that of the primary channel, and therefore can only be used conditionally.

The exemplary embodiments described in FIGS. 1, 2 and 3 are described for an automation system. However, a corresponding scenario can also be conceived in other monitoring systems, for example. For example, the senders of data in a security-oriented monitoring system can be controller units that issue instructions to different cameras which, on the basis of these instructions, bring different sections into focus or can be controlled with regard to the zoom factor. A redundant data transmission in accordance with the above-illustrated example can likewise be realized for the communication of the security-oriented cameras with the corresponding central offices at which the data is analyzed. The cited exemplary embodiments in an automation system or in a security-oriented monitoring system merely represent possible implementations of the invention. Any other architecture in which a communication system is to transmit security-relevant data between senders and recipients can be realized in accordance with the same principle.

A security protocol which exists in the context of a fail-safe application is not disrupted as a result of implementing the invention, but is instead given high availability. This guarantees the realization of a combination of security-oriented and high-availability automation solutions.

Figure 4:
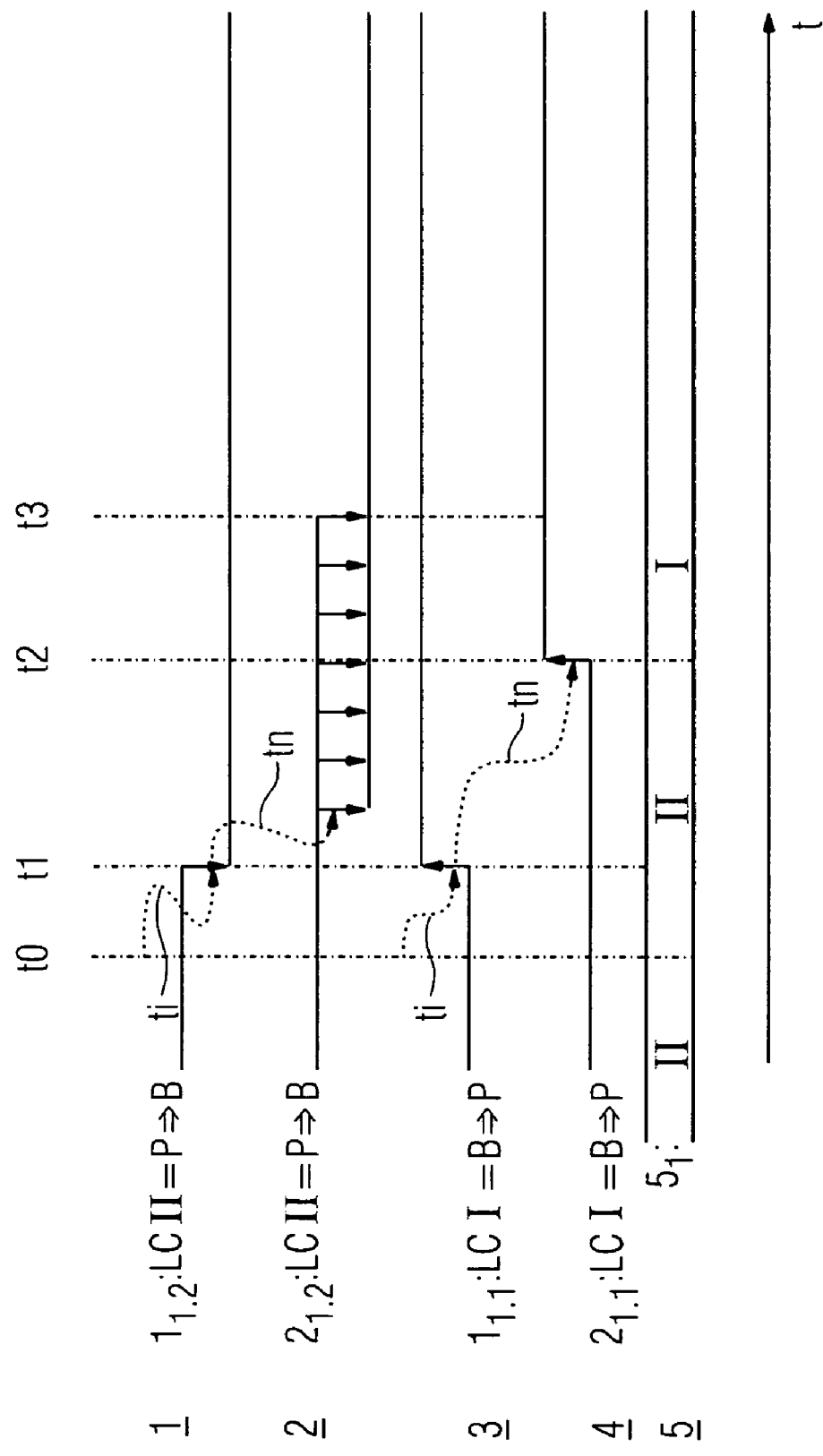
FIG. 4 shows a schematic illustration of the switchover between the channels of the communication system.

FIG. 4 schematically illustrates the principle of switching between two communication channels LC I, LC II. In this context, the status indicator S of the payload data telegram N is shown such that the horizontal lines represent the value of the bit of the status indicator S. In this context, the uppermost horizontal line is the status S of the payload data telegram N which is cyclically sent e.g. by a sender, by the field bus controller $1_{1.2}$ in the present case. The channel LC II, via which the field bus controller $1_{1.2}$ sends in FIG. 3, is initially primary channel P. This can be detected in that the previous (not shown) flank of the status bit of the payload data telegram is set to 1. At the time point $t_0$, either an error is detected or a switchover of the communication channels is otherwise induced in the communication system. An information item $t_1$ is then generated by the sender, the field bus controller $1_{1.2}$, and is transferred by the sender, the field bus controller in the present case, at the time point $t_1$. The channel LC II, which was originally set to primary channel status, is now switched to backup channel B as a result of the transfer of a payload data telegram N. In FIG. 4, this can be seen in the first line, which represents the status of the telegram, in that the status is set from 1 to 0 by means of a flank at the time point $t_1$. With effect from the time point $t_1$, the sender $1_{1.2}$ therefore continues to send data via the channel LC II, wherein this data only represents backup data, however.

The second line of FIG. 4 illustrates the response of the recipient $2_{1.2}$ to the transfer of the payload data telegram containing the changed status bit, i.e. the flank change and the subsequent channel switchover. $t_n$ is the time required by the payload data telegram N, which is transferred by the sender $1_{1.2}$, to arrive at the recipient $2_{1.2}$. At the instant the recipient $2_{1.2}$ receives the new payload data telegram with the status change, which now indicates that channel LC II is to function as a backup channel, the recipient $2_{1.2}$ also responds. After it has received the payload data telegram, the recipient knows that channel LC II is now switched to backup. The recipient is informed of the status change depending on the propagation time $t_n$, i.e. after the time which the payload data telegram N requires to arrive at the recipient from the sender. Various propagation times of the data telegrams are possible in this context, and this is illustrated by the multiplicity of arrows marking the flank change from 1 to 0.

The status of the sender $1_{1.1}$ is illustrated in line 3. The sender initially sends payload data telegrams N via the channel LC I. The channel LC I is initially switched as backup channel B. This can be seen in the lower line. At the time point $t_0$, the sender $1_{1.1}$ then receives the information that the switchover is to take place. The sender requires a certain time $t_i$ internally in order to package this information into the next payload data telegram N, thereby indicating a status change. At the time point $t_1$, the status bit in the payload data telegram is then changed from 0 to 1 and the sender $1_{1.1}$ now indicates, by means of transferring a payload data telegram containing the corresponding status indicator, that channel LC I is to be switched to primary channel.

Line 4 of FIG. 4 illustrates the behavior of the recipient $2_{1.1}$. The recipient initially receives payload data telegrams via channel LC I as backup channel B. The status bit is set to 0 in this context. At the time point $t_2$, the recipient $2_{1.1}$ receives the payload data telegram N from the sender $1_{1.1}$, with the information that the data is sent via channel LC I as primary channel P. This can be seen in the change of the status bit from 0 to 1. A certain data propagation time $t_n$, which the payload data telegram N requires for the distance from the sender $1_{1.1}$ to the $2_{1.1}$, has likewise elapsed again in this context.

Line 5 of FIG. 4 illustrates the channel from which the field device 5 uses the data. Until the time point $t_0$, at which the switchover takes place, the field device uses the data that is received via channel LC II as primary channel, as data that is relevant as such. From the time point $t_0$ the time point $t_2$, this channel must be considered to be the primary channel. As a result, the field device continues to use its data from channel LC II. At the time point $X_2$, the switchover is performed at the recipient device $2_{1.1}$ and thereafter the channel LC II is switched to backup channel B and the channel I to primary channel P. The information which is received via the channel II is used in the corresponding field device until $t_2$.

In example shown, a further backup-primary switchover is possible after the time point $t_3$. In case the telegram with the negative primary flank arrives before $t_2$, the system is configured such that the time between the arrival of the telegram and $t_2$ is monitored by means of a parameterized retention time. When this retention time which can be parameterized expires, the recipient switches its data to replacement values. In case the telegram with the negative primary flank arrives after $t_2$, a possible new primary-backup flank, i.e. a re-switch of the primary channel, is delayed correspondingly. The parameterized retention time firstly ensures that the field device retains the most recent data that is received via the primary channel until it is clear which channel is subsequently to be used for sending, and only then does the switchover to this channel take place. Secondly, the data is set to replacement values when the retention time expires.

Figure 5:
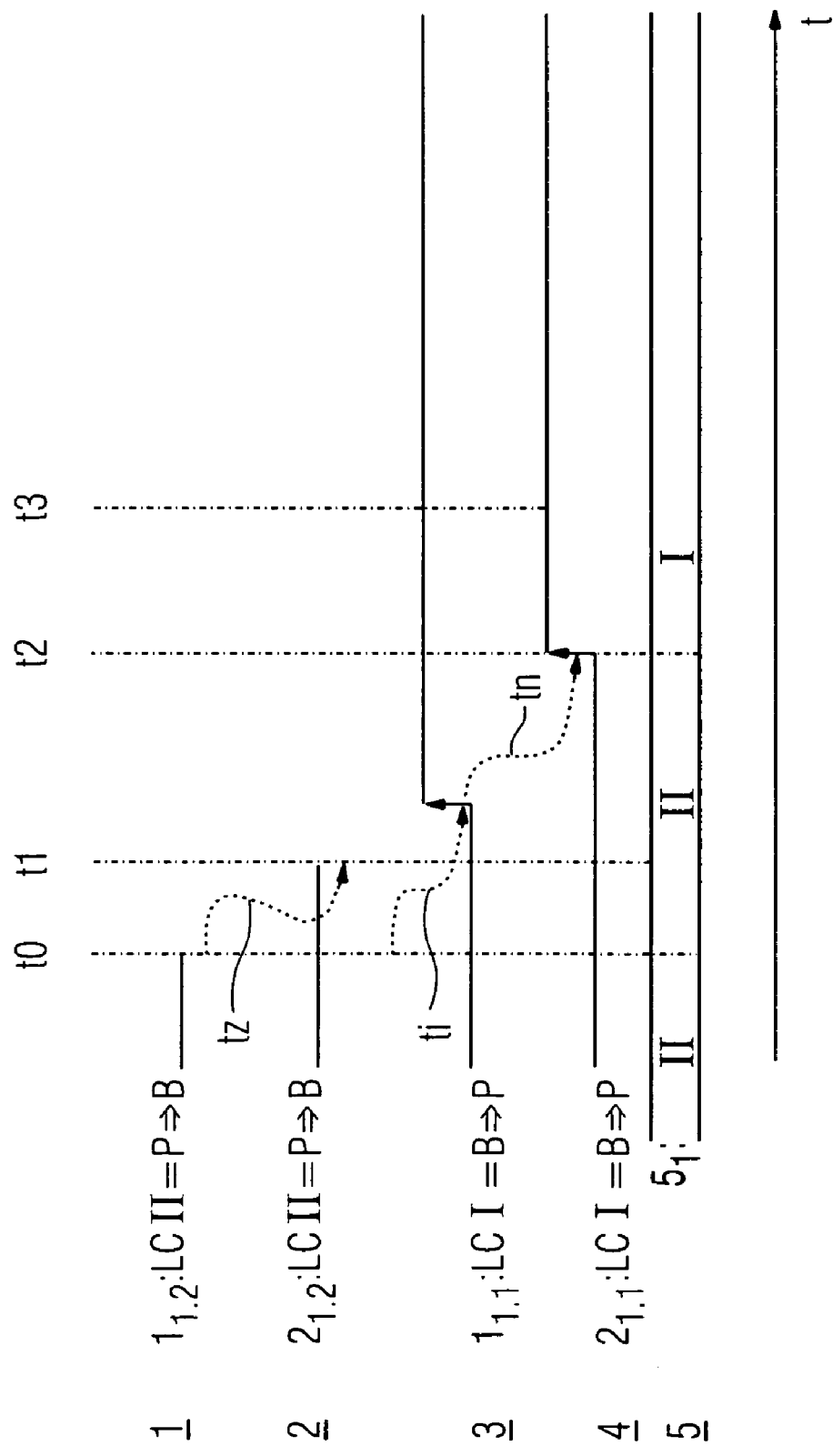
FIG. 5 shows a schematic illustration of the switchover between the channels of the communication system in the case of a failure of a sender.

A similar scenario is illustrated in FIG. 5, wherein in this case the sender $1_{1.2}$, which previously sent via the channel LC II as primary channel, fails completely at the time point $t_0$. At the time point $t_1$ the recipient $2_{1.2}$ establishes that it has not received a data telegram as expected from the sender $1_{1.2}$. This time of non-occurring telegram transmission is illustrated as TZ. At a time point $t_1$ which is subsequent to, the send device $1_{1.1}$, the redundant field bus controller for the sender $1_{1.2}$, detects that its redundant communication station has failed. At this time point the field bus controller then switches the channel LC I from backup channel to primary channel P. As illustrated in FIG. 5, this is done by setting the bit from 0 to 1, which then results in a corresponding primary channel flank in the telegram. The receive device $2_{1.1}$, which subsequently receives the payload data telegram from the sender or field bus controller $1_{1.1}$ after the time $t_n$, likewise switches the channel LC I from backup channel to primary channel following receipt of the payload data telegram. In the present case, the data which is used by the field device 5 was originally from the channel LC II, which was originally primary channel P. After failure of the field bus controller $1_{1.2}$, the field device 51 retains the most recently received data of the primary channel LC II until it receives a new information item from the new recipient, the interface module $2_{1.1}$, to the effect that the channel LC I now functions as primary channel and that the data received via this channel is to be used.

In this case, the retention time starts with $t_1$. If $t_2$ comes after the parameterized retention time, the data is set to replacement values upon expiry of the retention time. As soon as the flank change ($t_2$) occurs, the data of the channel I is used.

The subject matter of the invention, wherein a simple status indicator e.g. a bit is transferred via the payload data telegrams N, is therefore realized in a simple manner overall. In this context, the valid data is always assumed to be that which was received from the channel having the most recent flank change of the status bit from backup to primary. As a result of introducing the retention time, it is ensured that the field devices are always supplied with the most recently valid payload data. If a defined time is exceeded and no correct switchover between the channels occurs, all participating communication stations switch to a defined fallback state. This ensures that no undefined states occur.

Figure 6:
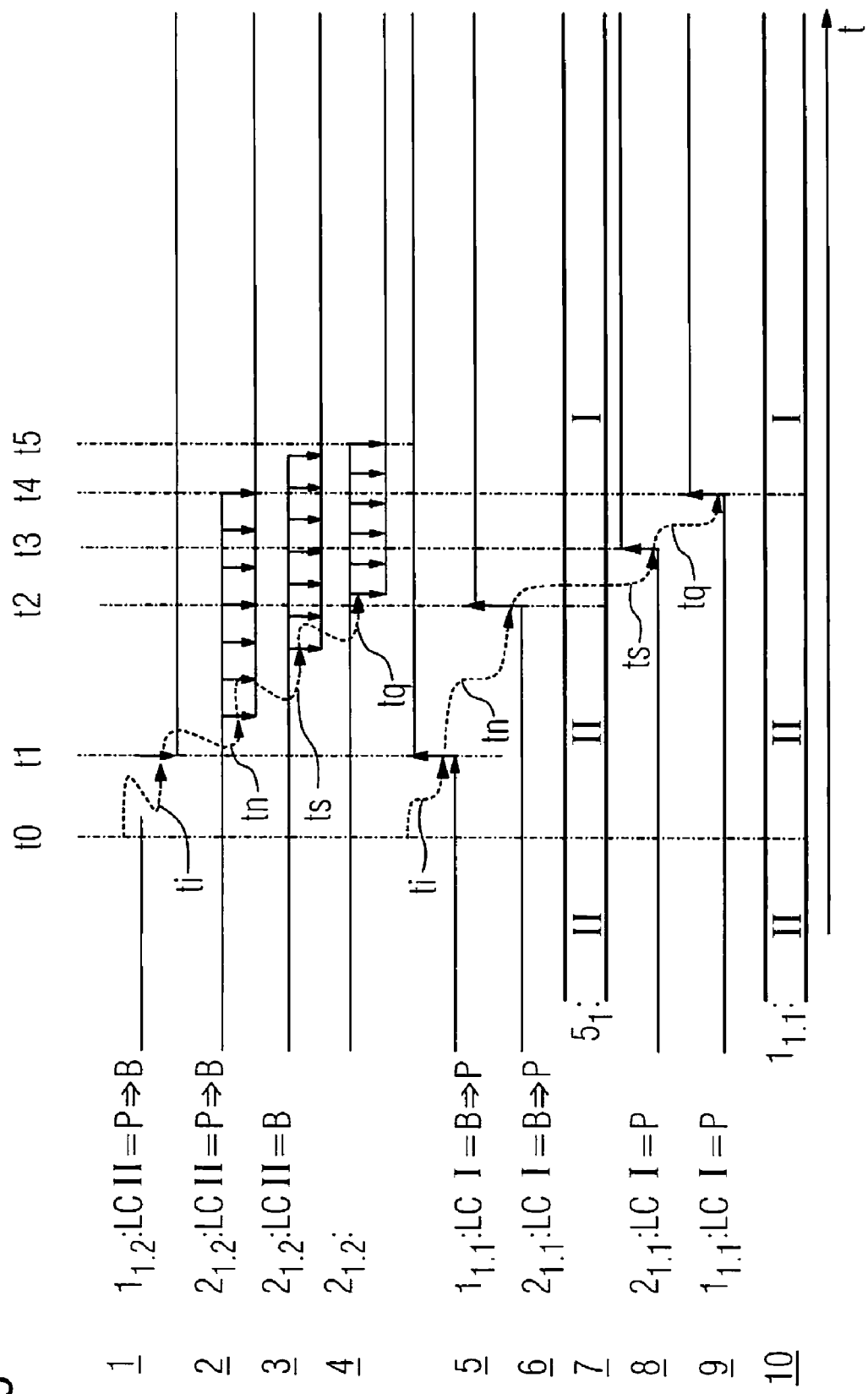
FIG. 6 shows a schematic illustration of the switchover of the channels of the communication system including acknowledgement from the recipient.

FIG. 6 illustrates the same scenario as in FIG. 4. In addition to showing the flanks of the sender $1_{1.2}$ and the recipient $2_{1.2}$, which switch over from primary channel to backup channel as a result of the switchover, lines 3 and 4 indicate the corresponding responses of the two stations to the acknowledgement or notification. $t_S$ in line 3 shows the time period which is required, after receipt of the payload data telegram containing the information relating to the channel switchover, by the recipient $2_{1.2}$ itself again to compose a dedicated telegram, e.g. comprising information from the field devices, and then to send this telegram containing the changed status indicator, specifically to the effect that a switchover from primary channel P to backup channel B has taken place, to its communication partner, e.g. the original sender $1_{1.2}$, i.e. the field bus controller.

$t_Q$ in line 4 then specifies the time period which the data telegram requires in order to travel from the new sender, the interface module $2_{1.2}$, to the original sender and current recipient, the field bus controller $1_{1.2}$. The original sender $1_{1.2}$ therefore receives an acknowledgement from the original recipient $2_{1.2}$ to the effect that the data telegram has been received and that the corresponding channel switchover of the channel LC II from primary channel P to backup channel B has taken place.

The lines 5 and 6 show the corresponding reactions of the redundant communication stations as in FIG. 4. In this case, line 5 shows the switchover of the communication channel LC I from backup channel B to primary channel P by the sender $1_{1.1}$. At the time point $t_1$, a corresponding payload data telegram N is sent containing the status information relating to the change. At the time point $t_2$, the recipient $2_{1.1}$ receives the information with the payload data telegram, which required a time $t_n$ to travel the distance. At the time point $t_2$, the recipient $2_{1.1}$ then likewise switches from backup channel B to primary channel P for channel LC I.

As in the previous scenarios, the field device 51 must retain the data which was received via the original primary channel LC II until it receives the new payload data from the interface module $2_{1.1}$ at the time point $t_2$, wherein said new payload data concurrently includes the status information relating to the primary channel P. At the time point $t_3$, the interface module $2_{1.1}$ sends the information to the effect that it is now using channel LC I as primary channel for the payload data transmission. For this, the interface module likewise required a certain time, $t_S$, to compose a new payload data telegram and send it with the data from the field device via the communication system. At the time point $t_4$, the associated field bus controller $1_{1.1}$ receives the data from the interface module, i.e. the new payload data and hence the switchover acknowledgement, to the effect that channel LC I is now being used as primary channel.

Line 10 specifies how e.g. a CPU, i.e. the host with which communication originally took place as per FIG. 3, in the system is to act with regard to the utilization of data. The data from the channel LC II is originally recognized as primary data. The channel LC II is considered by the host $4_1$ to be primary channel P until the host or the CPU receives the signal from the field bus controller $1_{1.1}$ to the effect that the payload data telegrams are now transferred via the channel I as primary channel P.

By virtue of the method illustrated in the figures, it is ensured that all participating communication stations are provided with the current relevant information relating to the communication system at all times, and that it is unambiguously clear which data must be used as payload data by the participating communication stations at all times. In particular, the feedback by means of acknowledgement telegrams allows the participating communication stations to exactly define a time point at which they must switch over from one channel to the other channel for the utilization of the data which is distributed via the communication system, and also how long they must retain the payload data telegram most recently sent via the currently valid primary channel P.

Figure 7:
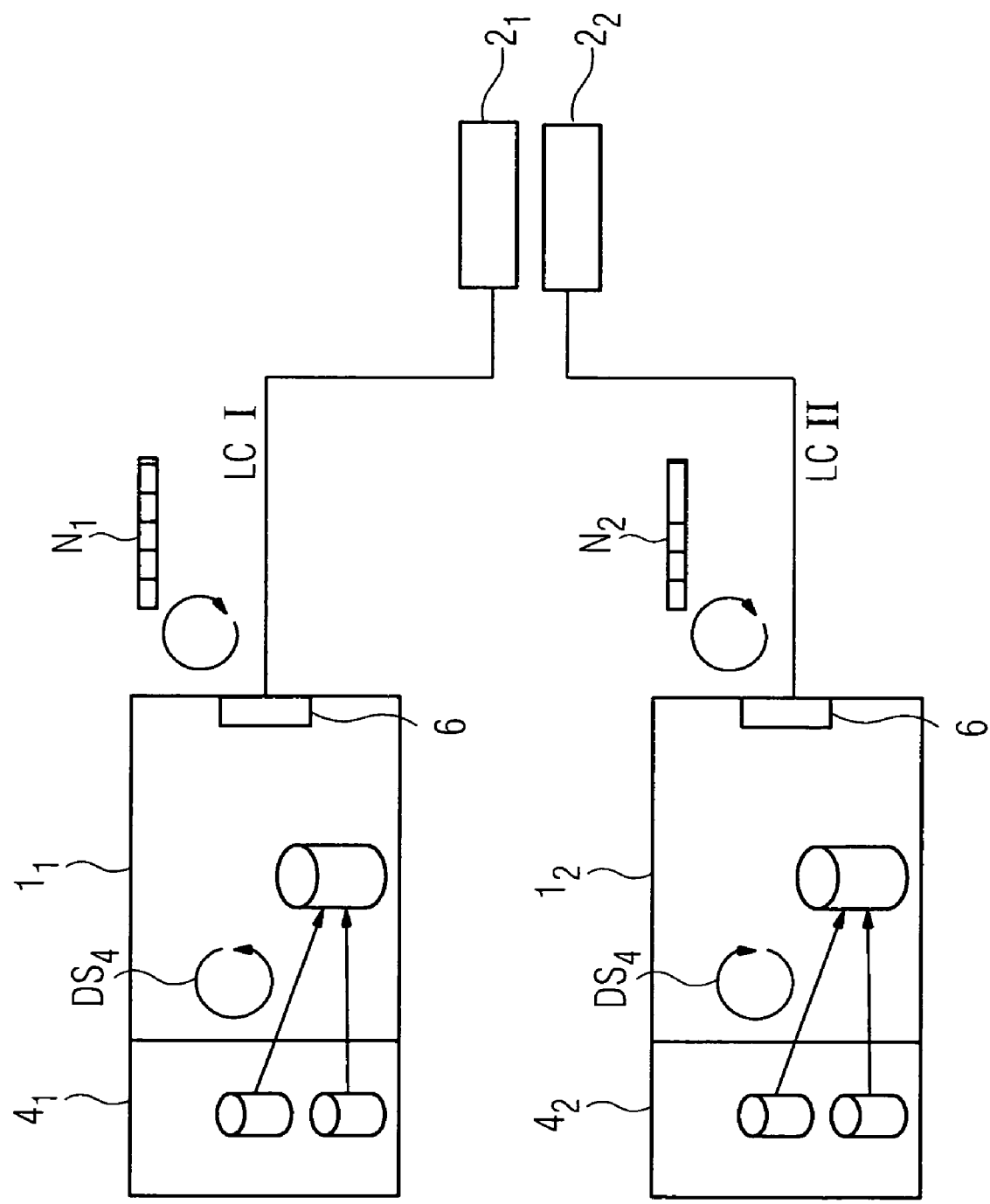
FIG. 7 shows a schematic illustration of the delay in the switchover from backup to primary channel in the case of a sender.

FIG. 7 again illustrates by way of example how the cyclical data provision and data transfer functions in a corresponding system according to the invention. $4_1$ and $4_2$ represent so-called hosts, e.g. a redundant CPU. $1_1$ and $1_2$ are field bus controllers which collect the payload data from the redundant CPUs via a cyclical process and prepare said payload data for dispatch via the system. The collection of the data requires a certain time period $DS_4$. The data is then transferred via the interfaces 6 to the interface modules $2_1$ and $2_2$. The channel LC II is originally primary channel P for the transfer of data. The field bus controllers $1_1$ and $1_2$ then transfer the data via the system again, likewise in a cyclical manner. In order to ensure that the correct data is available for all stations at all times, the field bus controller $1_2$ immediately changes from primary channel to backup channel if an error occurs or a switchover is requested. When switching over from backup channel B to primary channel P, the field bus controller $1_1$ must wait for a full data collection cycle $DS_4$ to be completed internally before it can transfer its associated payload data telegram $N_1$ via the communication system. Any data loss or switchover impact is thereby prevented in all cases.

FIG. 8 illustrates the converse case, in which the information is sent continuously from the controllers $1_1$ and $1_2$ independently of their internal cycle in the form of payload data telegrams $N_1 \ldots N_n$ to the recipients $2_1$ and $2_2$. The recipients then collect data via the channel which is primary until they receive a payload data telegram with a flank change. This telegram is sent by the sender, the controller, after the occurrence of an error, and precisely when said sender has received the last information item of a data query cycle. Thereafter, the recipients use the data which is received via the channel with the most recent flank change from backup to primary.

The invention claimed is:

1. A communication system, comprising:
   two communication stations;
   a communication connection between the communication stations, wherein the communication connection features at least two channels for transmitting payload data telegrams, wherein only one channel acts as primary channel for the communication at any time, and wherein at least one other channel is provided as backup channel; and
   a status indicator in the payload data telegram for an indication of information concerning which channel is primary channel or backup channel at a given time point, wherein the communication stations adopt as primary channel that channel for which, during receipt of the payload data telegrams, the most recent status change from backup channel to primary channel was detected by the communication stations.

2. The communication system as claimed in claim 1, wherein one bit is provided as a status indicator in the payload data telegram.

3. The communication system as claimed in claim 1, wherein all communication stations are equipped for sending and receiving payload data telegrams.

4. The communication system as claimed in claim 1, wherein in case of a sender of a payload data telegram, the change of the status from the primary channel to the backup channel takes place without a delay.

5. The communication system as claimed in claim 1, wherein in case of a sender of a payload data telegram, the change of the status from the backup channel to the primary channel does not take place until the sender has completely updated its following payload data telegram.

6. The communication system as claimed in claim 1, wherein the communication stations store the most recent payload data telegram that was received via a primary channel, if all channels have the status backup channel.

7. The communication system as claimed in claim 6, wherein a predefined time is provided for the storage of the payload data telegrams, and a predefined response of the communication stations is provided after expiry of said time.

8. The communication system as claimed in claim 7, wherein the communication stations are redundantly arranged such that they are at least duplicated.

9. The communication system as claimed in claim 1, wherein a redundantly configured sender of a payload data telegram is configured in such that it detects the failure of its redundant communication station and switches the status of its channel to primary channel.

10. The communication system as claimed in claim 2, wherein a recipient of a payload data telegram is configured in such that it detects the failure of the receipt of payload data telegrams and switches the status of the receive-side primary channel from primary channel to backup channel on the sending side.

11. A method for reliable communication between communication stations, comprising:
    transmitting payload data telegrams between the communication stations via at least two channels, wherein only one channel acts as primary channel for the communication at any time and wherein the other channels are backup channels; and
    providing a status indicator, wherein the information concerning which channel is primary channel or backup channel at a given time point is indicated via the status indicator in the payload data telegram, wherein the communication stations adopt as primary channel that channel for which, during receipt of the payload data telegrams, the most recent status change from backup channel to primary channel was detected by the communication stations.

12. The method as claimed in claim 11, wherein one bit in the payload data telegram is used as a status indicator, wherein 1 indicates the status primary channel and 0 indicates the status backup channel.

13. The method as claimed in claim 11, wherein a sender of a payload data telegram changes the status from the primary channel to the backup channel without a delay.

14. The method as claimed in claim 11, wherein a sender of a payload data telegram changes the status from the backup channel to the primary channel is not before the sender has completely updated its following payload data telegram.

15. The method as claimed in claim 11, wherein the communication stations store the most recent payload data telegram that was received via a primary channel, if all channels have the status backup channel.

16. The method as claimed in claim 15, wherein the payload data telegrams are stored for a predefined time and a predefined response of the communication stations takes place after expiry of said time.

17. The method as claimed in claim 11, wherein the communication stations are redundantly arranged such that they are at least duplicated.

18. The method as claimed in claim 11, wherein a redundantly configured sender of a payload data telegram detects the failure of its redundant communication station and switches the status of its channel to primary channel.

19. The method as claimed in claim 11, wherein a recipient of a payload data telegram detects the failure of the receipt of payload data telegrams and switches the status of the receive-side primary channel from primary channel to backup channel on the sending side.

20. The method as claimed in claim 11, wherein the communication stations are components of a security-oriented monitoring system.

* * * * *